Oct. 17, 1933.　　　D. A. GREENE　　　1,931,159
WATER GLASS COOLER
Filed Dec. 7, 1928　　　4 Sheets-Sheet 1

INVENTOR.
Daniel A. Greene
BY
ATTORNEY.

Oct. 17, 1933.  D. A. GREENE  1,931,159
WATER GLASS COOLER
Filed Dec. 7, 1928     4 Sheets-Sheet 3

INVENTOR.
Daniel A. Greene

ATTORNEY.

Oct. 17, 1933.  D. A. GREENE  1,931,159
WATER GLASS COOLER
Filed Dec. 7, 1928   4 Sheets-Sheet 4
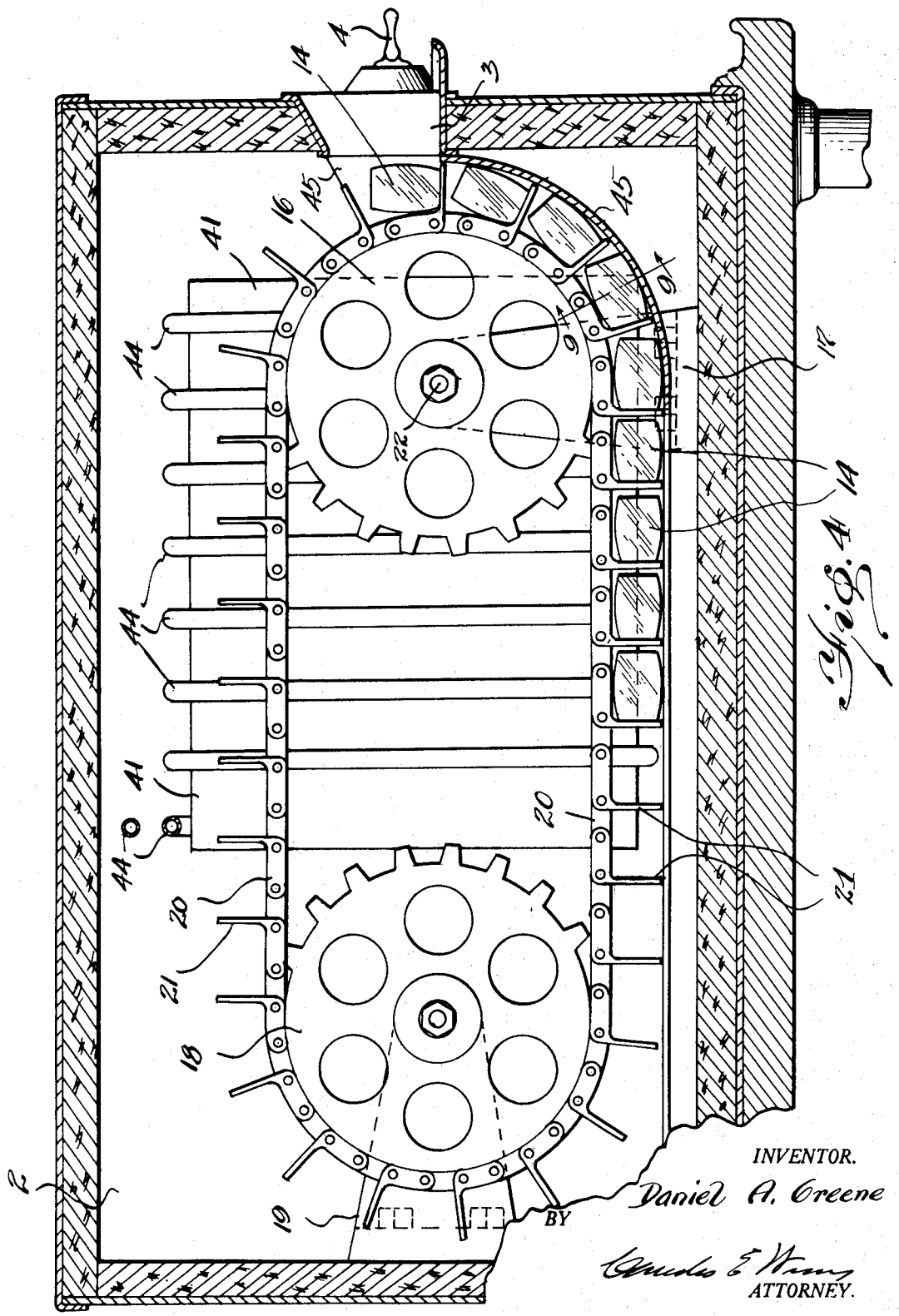
INVENTOR.
Daniel A. Greene
BY
ATTORNEY.

Patented Oct. 17, 1933

1,931,159

UNITED STATES PATENT OFFICE 1,931,159

WATER GLASS COOLER

Daniel A. Greene, Flint, Mich.

Application December 7, 1928. Serial No. 324,450

3 Claims. (Cl. 312—36)

This invention relates to water glass coolers and the object of the invention is to provide a machine, in which water glasses may be cooled prior to use, combined with a dispensing device for delivering the glasses to the operator one at a time.

A further object of the invention is to provide an arrangement whereby the water glasses may be stored in rows in a cooling chamber and may be delivered to a chain conveyor which may be moved by the operator to deliver the glasses one at a time.

A further object of the invention is to provide a machine in which drinking water may be cooled for use in the glasses.

Another object of the invention is to cool the glasses to such a point that the glass itself takes the place of the ice normally used in the water glasses thus insuring a more sanitary condition.

These objects and the several novel features of the invention are hereinafter more fully described and claimed and the preferred form of construction by which these objects are attained is shown in the accompanying drawings in which—

Fig. 4 is a section taken on line 4—4 of Fig. 2.

Fig. 5 is an enlarged section taken on line 5—5 of Fig. 3.

Fig. 6 is an enlarged section taken on line 6—6 of Fig. 3.

Fig. 7 is an enlarged section taken on line 7—7 of Fig. 3.

Fig. 8 is an enlarged section taken on line 8—8 of Fig. 2.

Fig. 9 is an enlarged section taken on line 9—9 of Fig. 4.

Figure 1:
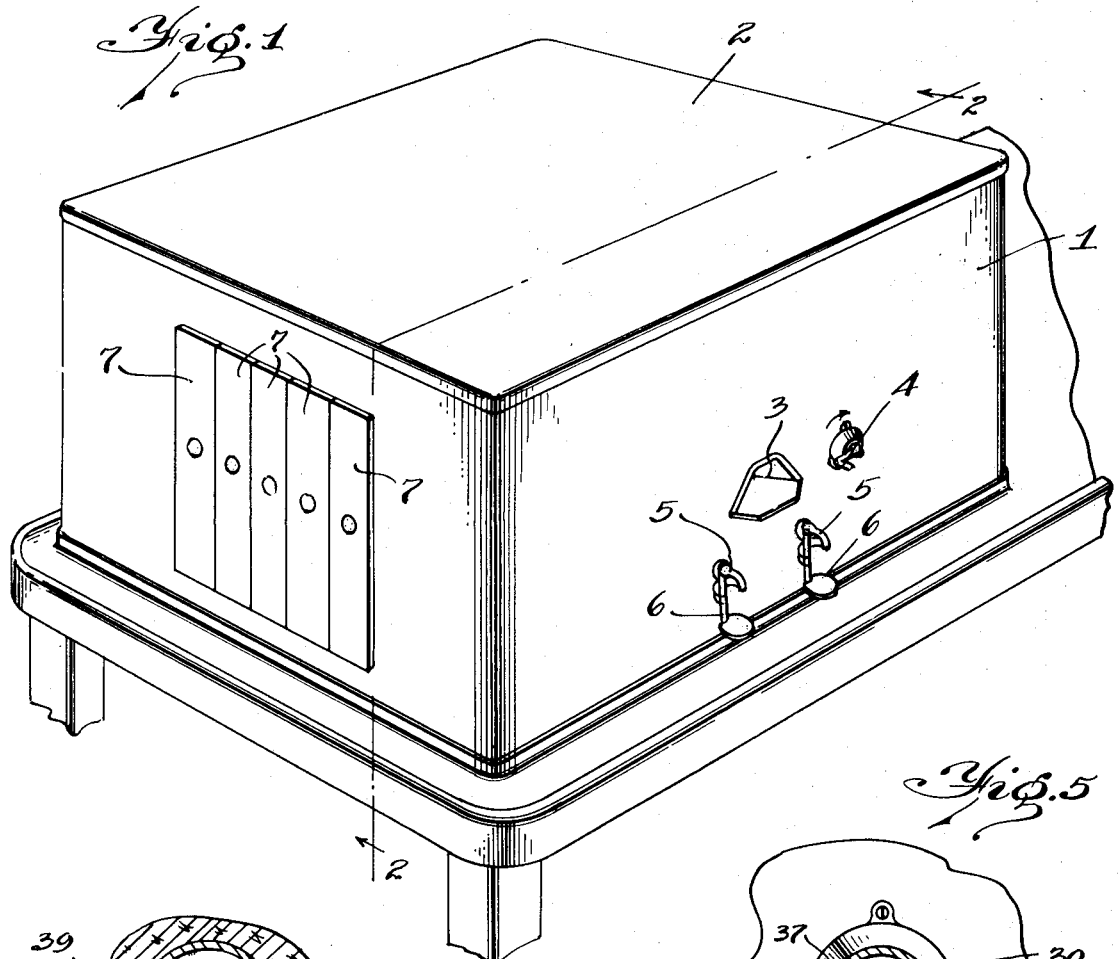
Fig. 1 is a perspective view of a machine embodying my invention.

The machine comprises a rectangular casing 1 having a top 2 which may be removable if desired. In the front of the machine an opening 3 is provided with which the cooled glasses may be moved to registration by a half turn of the crank 4. The drinking water is dispensed through faucets 5 each having a valve actuating mechanism 6 on which a water glass may be positioned to open the respective faucet. The object of the invention is to provide a machine which may be operated entirely by one hand and this machine is so designed that by means of a half turn of the crank 4 a cooled water glass is delivered to the opening 3 from which it may be removed with the hand and placed on the valve actuating member 6 causing the drinking water to discharge through the respective faucet 5 into the glass.

Figure 2:
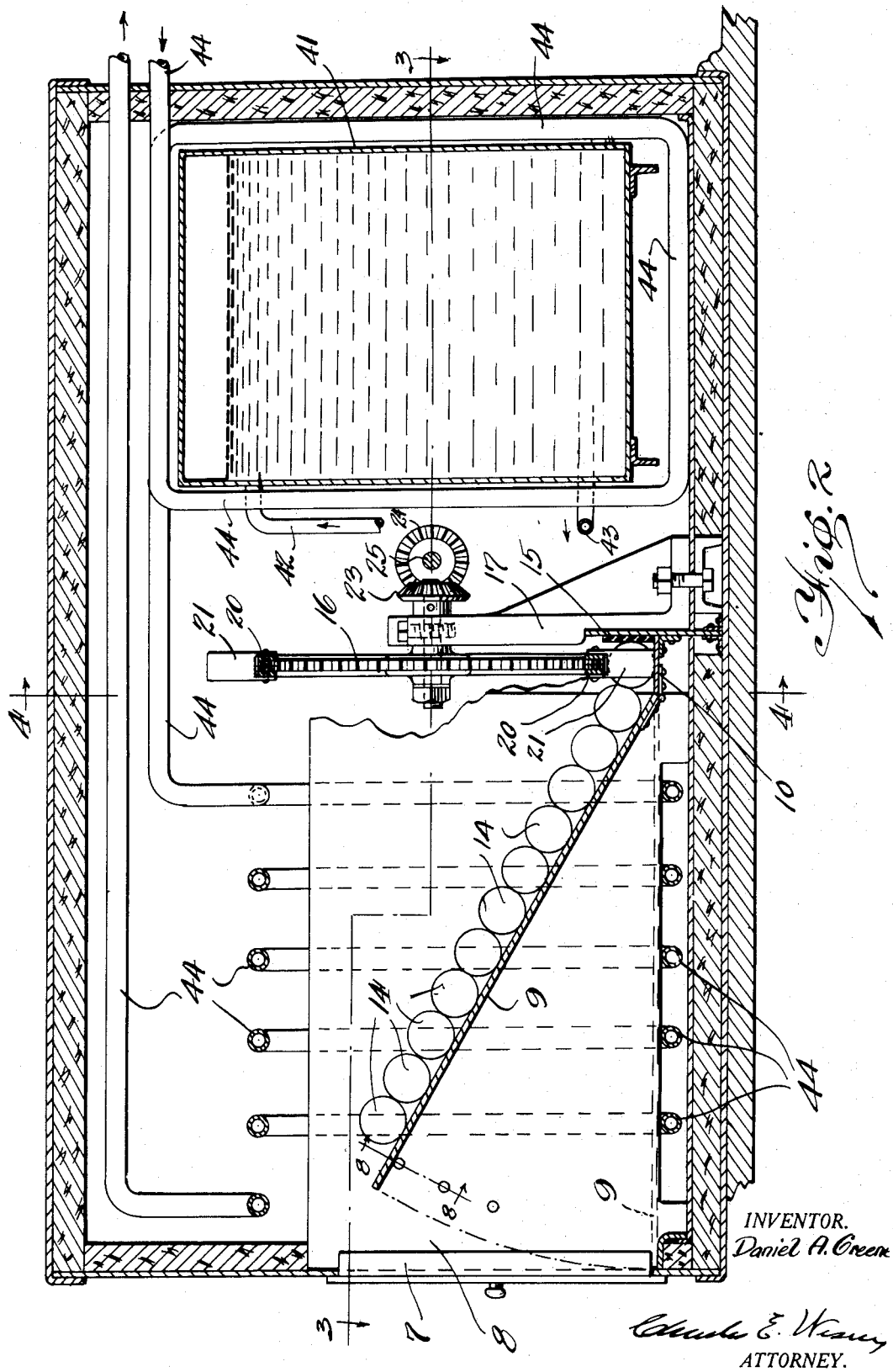
Fig. 2 is an enlarged longitudinal section therethrough taken on line 2—2 of Fig. 1.
Figure 3:
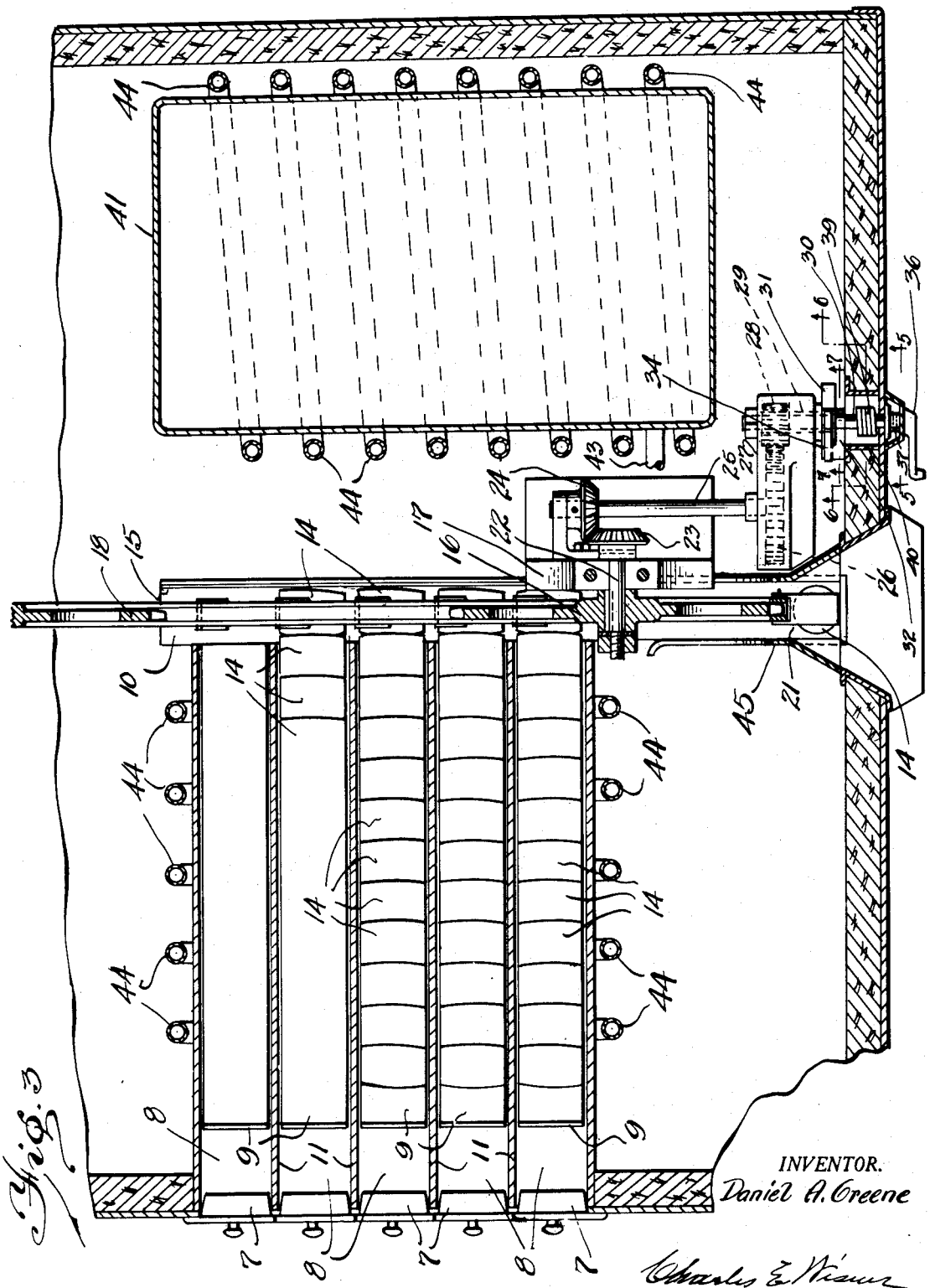
Fig. 3 is a section taken on line 3—3 of Fig. 2.

In order to properly cool the glasses it is necessary to store a considerable number of glasses in the machine for cooling before use. For this reason, as shown in Figs. 1, 2 and 3, five insulated closure members 7 are provided. These closure members, as shown in Fig. 3, fit in openings in the machine casing and each of these closure members may be removed to allow access to the several compartments 8. Each compartment 8, as shown in Fig. 2, is provided with a hinged bottom 9 which is hinged to a flange 10 extending across the several compartments. The partitions 11 between the compartments are provided with apertures 12 into which pins 13 may be inserted as shown in Fig. 8 to provide a support for the hinged members 9. As shown in Fig. 2, the glasses 14 are positioned on their sides so as to roll down the inclined compartment bottoms 9 a rubber strip 15 being provided against which the bottom glass strikes. As will be understood from Fig. 4 a large sprocket 16 is rotatably mounted on a bracket 17 in the machine and a companion sprocket 18 is rotatably mounted on a bracket 19 within the machine. An endless chain conveyor 20 engages over these sprockets 16 and 18 and every other link of the chain is provided with a flange 21 shown in Figs. 2, 3 and 9. As will be understood from Figs. 3 and 4 these flanges 21 are spaced apart sufficiently to allow a water glass 14 to pass therebetween.

As will be noted from Fig 4 it is necessary to advance the conveyor chain the length of a glass upon each operation so that the flanges 21 will successively register with the bottom of the opening 3 in the casing. For this reason the shaft 22 of the sprocket 16 is provided with a beveled gear 23 meshing with the beveled gear 24 on the shaft 25, as shown in Fig. 3. A spur gear 26 is secured to the end of the shaft 25 within the housing 27 and a small gear 28 meshes therewith. The small gear 28 is secured to a sleeve 29 which is rotatable on the shaft 30 and a ratchet 31 is secured to the end of the sleeve 29 exteriorally of the housing 27. As shown in Figs. 3 and 7 an arm 32 is secured to the shaft 30 by the pin 33 and a dog 34 is pivotally mounted on the end of this arm and engages the teeth of the ratchet 31, a spring 35 being provided to hold the dog in engagement with the ratchet. A crank 36 is secured to the end of the shaft 30 and a pin 37, as shown in Figs. 3 and 5, extends from the shaft 30 and normally engages a bracket 38 as shown in Fig. 5. This bracket 38 allows only a one-half revolution of the shaft 30 and the crank 36 and thus limits the rotative movement of the dog 34. As shown in Figs. 3 and 6 a spring 39 is secured to the shaft 30 at one end and at the opposite end is secured to the stationary housing 40. This spring normally holds the shaft in the position shown in Fig. 5 with the pin 37 engaging the bracket 38.

In operation the handle 36, shown in Figs. 1 and 2, is given a half turn until the pin 37 shown in Fig. 5 engages the opposite side of the bracket 38. The handle is then released and the spring 39 returns it to the original position. This movement of the handle and shaft 30 moves the dog 34 to turn the ratchet 31 and the sleeve 29 thus turning the small gear 28 which also turns the large gear 26. This turns the shaft 25 and by means of the beveled gears 24 and 23 turns the sprocket 16 to bring the next glass to registration with the opening 3 in the casing. As the spring returns the shaft 30 the dog 34 is moved back to position shown in Fig. 7 ready for a subsequent operation. The ratio between the gears 28 and 26 is approximately a six to one ratio and with this ratio each operation of the device moves the succeeding flange 21 shown in Fig. 4 to registration with the bottom of the opening 3 in the wall of the machine.

The compartments are loaded by opening the door 7 to the respective compartment at which time the pins 13 may be moved over as will be understood from Fig. 8 to allow the particular compartment bottom 9 to be moved down to the position shown in dotted lines in Fig. 2. At this time the glasses may be laid sidewise along the said member 9 and the said member 9 may be swung upwardly to the position shown in full lines in Fig. 2 to allow the glasses to roll down the inclined bottom by gravity. If the conveyor chain is already loaded as it passes the compartment the next succeeding glass will rest against the glass in the conveyor as shown and as these tumblers are usually barrel shaped the tumblers in the conveyor will readily pass those in the compartments as will be understood from Fig. 3. It will be noted from Fig. 3 that the glasses in the first compartment will pass into the conveyor chain first and then the glasses from the second compartment will pass into the conveyor chain and as the compartments are emptied in succession in this manner the emptied compartments may be refilled without stopping the operation of the machine.

As will be noted from Figs. 2 and 3 a water tank 41 is provided within the casing 1 having an inlet 42 and an outlet 43 which preferably leads to the faucets 5. In order to cool the water and glasses a cooling system is utilized and may be a brine circulating system in which the incoming brine passes through the pipes 44 coiled about the tank 41 as shown in Figs. 2 and 3 and the pipe then leads over and about the compartments 8 in which the glasses to be cooled are contained. The pipe leads from this last named coil back to the cooling unit. It is also possible to utilize the well known small refrigerating systems now on the market with this device by arranging the cooling coils thereof about the water tank and compartments in which the glasses are cooled. It is also possible to enclose the conveyor in an individual housing and pack the entire casing with ice if desired, in which case it is necessary to provide a drainage opening in the bottom of the casing. It will be noted from Figs. 3, 4 and 9 that a curved channel 45 is provided to retain the glasses in the conveyor and if desired this channel may be carried completely about the conveyor chain back to the compartments so that if any glass is carried past the opening 3 it will not fall off the conveyor chain but will be carried through the complete travel of the chain.

From the foregoing description it becomes evident that the device is simple and efficient in operation, is positive in action, will not readily get out of order, is of comparative low cost and provides a device which accomplishes the objects described.

Having thus fully described my invention, its utility and mode of operation, what I claim and desire to secure by Letters Patent of the United States is—

1. In a device of the character described, a casing having an opening in the side thereof, a crank mounted adjacent the opening and adapted to be turned through a half circle, a dog movable by the crank, a ratchet movable by the dog, a gear reduction mechanism movable by the ratchet, a sprocket rotatable by the gear reduction mechanism, a second sprocket, an endless conveyor chain engaging over the sprockets, a series of spaced flanges carried by the conveyor chain, a series of compartments each having a sloping bottom discharging between the flanges of the conveyor chain, the bottom of each compartment being individually hinged and adapted to be swung to horizontal position for filling, and returned to position at an angle to the horizontal whereby articles thereon are fed by gravity one by one to the conveyor as the conveyor is moved, the construction being such that the bottom article of a compartment fed to the conveyor holds the remainder of the series from discharge until the positioned article is carried out of contact therewith and an empty portion of the conveyor brought to position substantially as described.

2. In a device of the character described, a casing, an endless conveyor therein having spaced flanges forming compartments, a series of compartments in the casing each having an inclined bottom down which articles may feed by gravity, said casing compartments being arranged to be turned to a horizontal plane to receive the articles and to an inclined plane to cause the same to feed by gravity, said casing having an opening permitting access thereinto to load the casing compartments, a conveyor traversing the casing across the lower end of the casing compartments and being positioned in a horizontal plane whereby the bottoms of the conveyor compartments form a continuation of the casing compartments, means for causing step by step operation of the conveyor to bring the compartments thereof successively to registration with the bottoms of the casing compartments, said casing further having an opening provided with a horizontal bottom wall, means whereby each operation of the conveyor brings a compartment thereof to stationary position opposite the said last named opening of the casing whereby at each operation of the conveyor an article is stationarily supported in a position accessible through the opening.

3. In a device of the character described, a casing having a vertical front wall provided with an opening, a pair of sprockets positioned therein rotatable upon horizontal axes, an endless conveyor engaging the sprockets having a series of flanges spaced longitudinally thereof, a stationary channel member below the lower horizontal portion of the conveyor and providing a bottom for the space between the flanges of the conveyor as it passes thereabove, the bottom of the said front opening of the cabinet being approximately in the same plane as a line passing through the axes of the sprockets, means for operating the sprockets whereby at each actuation thereof a flange of the conveyor is brought to approximately the same horizontal plane as the bottom of the said opening, a series of compartments within the casing hinged at the lower end permitting the same to be swung from horizontal position to a position at an angle to the horizontal, the bottom ends of the said compartments being positioned to discharge the material by gravity onto the said stationary channel, the arrangement of the parts being such that at each operation of the sprockets the spaces between the flanges of the lower horizontal position of the conveyor are respectively positioned opposite the discharge ends of the compartments whereby a vendable article in the compartments may pass onto the stationary channel as the empty spaces of the conveyor register therewith.

DANIEL A. GREENE.